A. ATWOOD.
Grain Mill.
No. 15,680.  Patented Sept. 9, 1856.
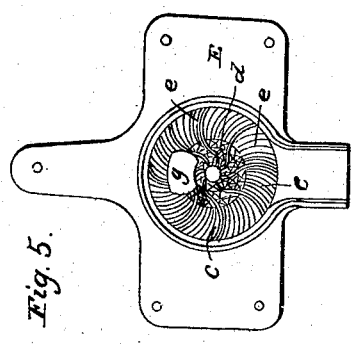
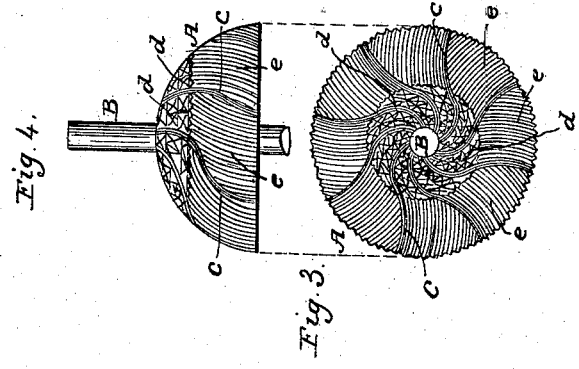
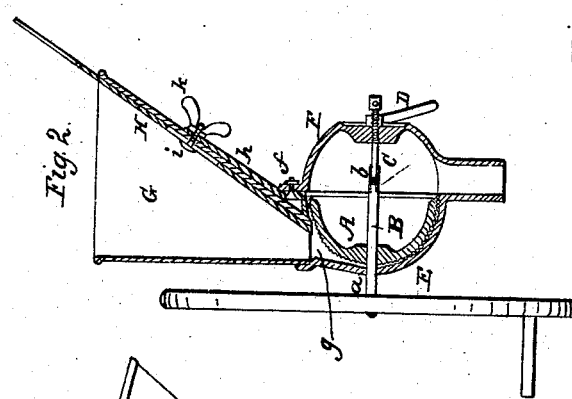
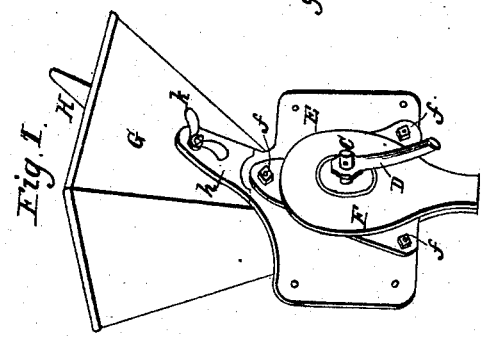

UNITED STATES PATENT OFFICE.

A. ATWOOD, OF TROY, NEW YORK.

DRESS OF METALLIC HEMISPHERICAL GRINDING-MILLS.

Specification of Letters Patent No. 15,680, dated September 9, 1856.

*To all whom it may concern:*

Be it known that I, A. ATWOOD, of Troy, in the county of Rensselaer and State of New York, have invented certain new and useful Improvements in Mills for Grinding Grain and Other Substances; and I do hereby declare that the following is a full, clear, and exact description of the same, reference being had to the annexed drawings, forming part of this specification, in which—

Figure 1 is a general perspective view of the mill. Fig. 2 is a vertical sectional view; Fig. 3 a top view of the rotating hemispherical grinding plate. Fig. 4, is a side elevation of the same, and Fig. 5 is a plan of the stationary concave grinding plate, covering the rotating plate, the same letters having reference to like parts in each of the figures.

The nature of my invention consists in combining a series of radial ogee shaped ribs and furrows; with interposing ribs and furrows and the hemispherical or half ball shaped rotating grinding surface upon which they are formed—in the manner and for the purposes as hereinafter fully described.

The construction and operation of my mill is as follows, viz:

A is a cast iron hollow hemispherical rotating grinding surface secured upon the shaft or spindle B, which has its bearings at (*a*) and at (*b*) upon one end of the gage set screw C, the end of the spindle being made hollow to receive the set screw end. D is a check nut for holding the gage set screw in position when set. Upon the surface of this plate A I form a "dress" or grinding surface of a series of radial ogee shaped ribs and furrows (*c c*) having the intermediate surfaces formed near the mill spindle or center of motion, of diamond or other shape teeth or crackers (*d d*); or for each alternate row of cracking teeth, may be substituted a strong sharp rib.

(*e e*) are series of ribs and furrows interposed between the radial ogee ribs and furrows, and form the grinding or flouring surface of the mill.

The advantages obtained by the combination of the series of radial ogee ribs and furrows; with the ribs and furrows (*e e*) and hemispherical shaped rotating grinding plate A; is, that the discharge motion of the meal, after passing the cracking teeth and ribs, is retarded or slackened between the ribs and furrows (*e e*) by means of the ogee ribs and furrows; so that the meal receives more action of the grinding surfaces, and becomes finely floured before being discharged; while the hemispherical shape of the rotating grinding surface preventing any tendency to "choke" of the grain in the mill, or stopping of the mill, and also this combination and mode of construction admits of all the ribs and furrows being molded and cast in a perfect manner upon a hemispherical grinding surface, without the necessity of using a sectional pattern in molding.

E is a concave surface or shell of cast iron fitting on and covering the rotating part of the mill, having its grinding surface formed by the same combination of parts that is arranged upon the hemispherical plate A, viz: of a series of radial ogee ribs and furrows, and the intermediate surfaces formed into ribs and furrows and cracking teeth.

F is a cast iron concave receiver being nearly a counterpart of the covering E with the exception of having no grinding surface.

The mill is put together and held by bolts (*f f f*).

The hopper or funnel of the mill G, together with the sliding grate H for regulating the quantity of feed, are attached to and secured to the mill in the following manner: The plate E is made with a socket shaped feed mouth (*g*) and also with an arm (*h*), the hopper is made so that its neck will fit into the feed mouth (*g*) while a set screw (*i*) with a thumb nut (*k*) attaches and secures the hopper to the arm (*h*) and mill, and at the same place it passes through a slot in the gate H, and retains the same in any desired position.

Having fully described my improvements in grain and grinding mills—all that I claim as new therein, and my invention, and desire to secure by Letters Patent, is:

I claim the series of radial ogee ribs and furrows; in combination with the intermediate or interposing ribs and furrows, cracking teeth and hemispherical formed grinding surface, combined in the manner substantially and for the purpose as herein described.

ANSON ATWOOD.

Witnesses:
J. J. SAVAGE,
FREDK. G. BURNHAM.